United States Patent [19]

Scholer

[11] 3,739,946

[45] June 19, 1973

[54] COIN-FREED VENDING MACHINE

[75] Inventor: Mervyn Garnet Scholer, Killara, New South Wales, Australia

[73] Assignee: Cafe-Bar International Pty., Ltd., North Sydney, New South Wales, Australia

[22] Filed: June 15, 1971

[21] Appl. No.: 153,383

[30] Foreign Application Priority Data
June 23, 1970 Great Britain.................. 30,449/70

[52] U.S. Cl. ................ 222/2, 222/129.4, 222/132, 222/76
[51] Int. Cl. ........................................... B67d 5/10
[58] Field of Search ............ 222/129, 129.1, 129.2, 222/129.3, 129.4, 132, 2, 76; 194/13

[56] References Cited
UNITED STATES PATENTS

| | | | |
|---|---|---|---|
| 2,712,887 | 7/1955 | King.................................... | 222/132 |
| 2,776,074 | 1/1957 | St. Laurence........................... | 222/2 |
| 3,333,734 | 8/1967 | Breitenstein..................... | 222/129.4 |
| 3,606,961 | 9/1971 | King.................................... | 222/76 |

Primary Examiner—Allen N. Knowles
Attorney—Stevens, Davis, Miller & Mosher

[57] ABSTRACT

A beverage dispensing machine having a liquid dispenser and a plurality of solids dispensers. The dispensers are coin operated and auxiliary re-setting means puts a predetermined selection of the solids dispensers in an inoperative condition as a consequence of a predetermined number of operations of any one of the dispensers. A main re-setting means is associated with the remaining dispenser so that operation of the latter dispenser causes all solids dispensers not previously rendered inoperative to be inoperative.

7 Claims, 6 Drawing Figures

COIN-FREED VENDING MACHINE

This invention relates to beverage dispensing machines of the kind which comprise a plurality of solids ingredient dispensers to enable a user of the machine to select a desired combination of solids ingredients for mixing or dissolving in a liquid ingredient.

Typically, such a machine may have dispensers for each of powdered coffee and tea extracts, powdered dried milk or milk substitute and granulated sugar, together with a dispenser of hot water. In other cases the machine's solids dispensers may hold various other beverage ingredients, powdered soup concentrates, or the like.

In the case of a tea and coffee machine, for example, it is desirable to make available a choice of ingredients to the user; in that he may desire sugared or unsugared, milked or unmilked tea or coffee; furthermore, he may wish to operate one or other dispenser more than once depending on the "strength" of the corresponding ingredient that is required in the finished beverage.

Hitherto, machines of the kind under discussion have usually been placed in situations where prospective users may operate the machines freely. However, it is sometimes desired to have a coin or token operated machine and difficulties have been experienced in providing a machine which is coin operated and yet provides multiple choice facilities. For example, it has been proposed to provide a time controlled machine which frees the various dispensers for operation for a predetermined brief time following the insertion of a coin into the machine. However, this has not proved satisfactory for two reasons. Sometimes the time elapses before an inexperienced user obtains all of the ingredients for one serve of beverage, and at other times skilled and dishonest users may obtain more ingredients than required for a single serve of beverage during the time available.

With the foregoing in mind an object of the present invention is to provide a satisfactory coin or token freed, multiple-choice beverage dispensing machine.

For descriptive convenience the term "coin" is used herein to cover not only coins but also other coin-like tokens.

The invention consists in a beverage dispensing machine, comprising a liquid dispenser, a plurality of normally inoperative solids dispensers, coin operated means rendering at least said solids dispensers operative upon insertion of a coin, auxiliary re-setting means associated with all but a remaining one of said dispensers adapted to return a predetermined selection of said solids dispensers to the inoperative condition in consequence of a predetermined number of operations of any one of the dispensers with which said auxiliary re-setting means is associated neither said selection nor said number of operations necessarily being the same for each such dispenser, and a main re-setting means associated with said remaining one dispenser such that operation of said remaining one dispenser causes all said solids dispensers not previously rendered inoperative by said auxiliary re-setting means to be rendered inoperative.

According to preferred embodiments of the invention the main re-setting means is associated with the liquid dispenser.

According to one class of embodiments of the invention each solids dispenser is manually operated by the user pulling a lever, turning a knob or manipulating some other handle element connected to the dispenser proper by an appropriate mechanical linkage and is rendered inoperative by a solenoid operated stop or sprag acting on that linkage. Thus, the coin operated means are effective to energize the solenoids to withdraw the sprags or stops while the various re-setting means return the corresponding sprag or stop to its obstructing position.

According to another class of embodiment of the invention at least the solids dispensers are electrically operated by way of a push-button or other appropriate manually operable switch available to the user of the machine. In these instances the coin operated means are effective to supply electricity to the manually operable switch while the re-setting means disconnects that supply.

By way of example, two dispensing machines according to the invention are described hereinafter with reference to the accompanying drawings.

Figure 1:
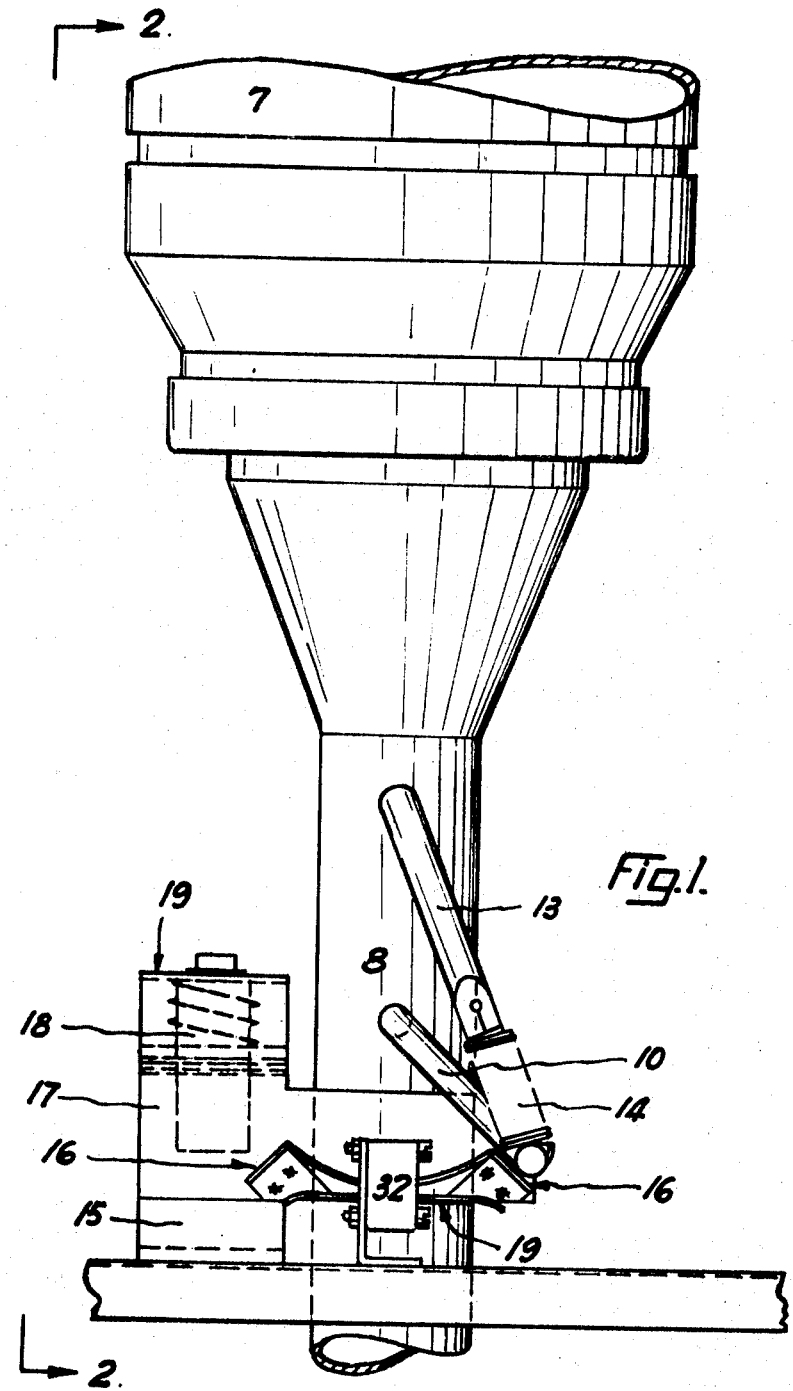
FIG. 1 is a rear elevation of the bottom part of a mechanically operated solids dispenser.
Figure 2:
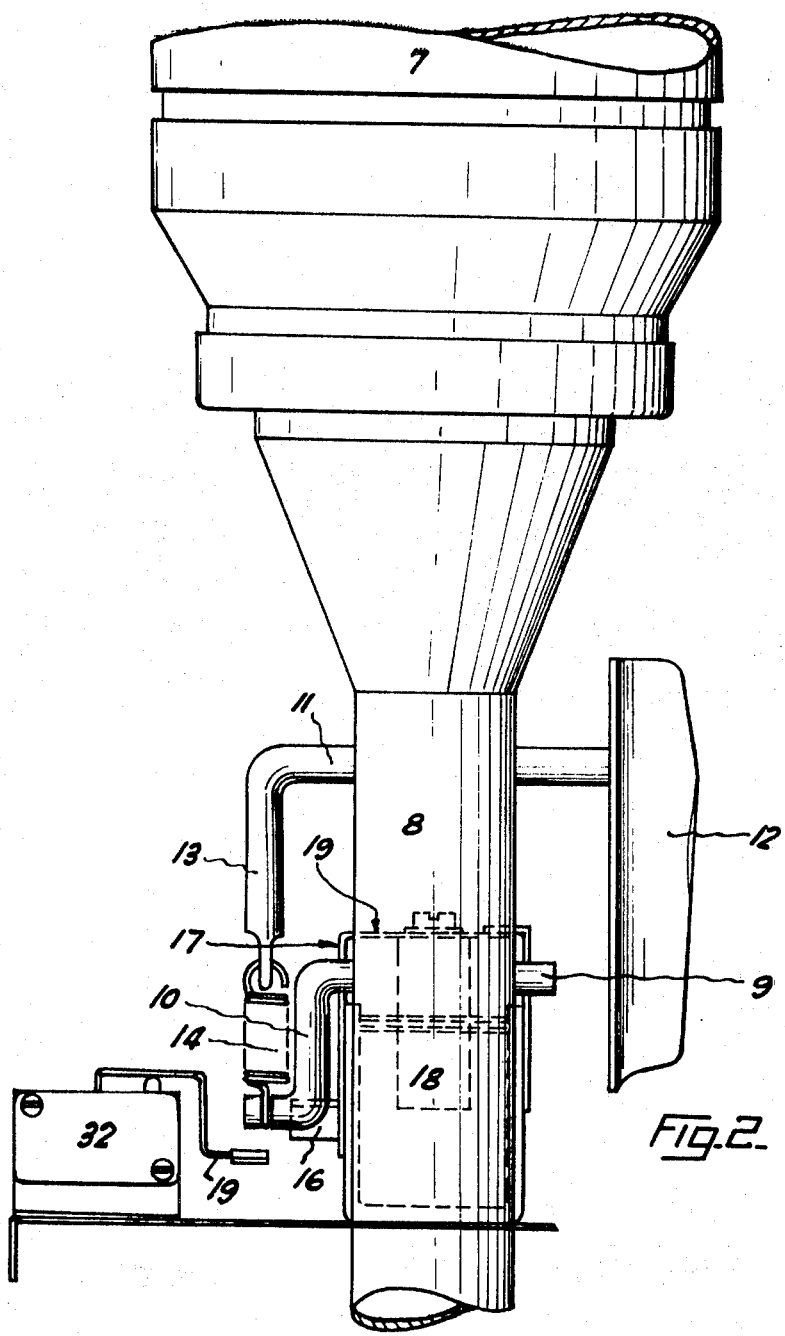
FIG. 2 is a view taken on line 2—2 of FIG. 1.

A tea and coffee dispensing machine may comprise a cabinet housing four solids dispensers of the kind illustrated by FIGS. 1 and 2, namely, a powdered tea extract dispenser, a powdered coffee extract dispenser, a dried and powdered milk dispenser and a granulated sugar dispenser. Each of said solids dispenser comprises a container 7 with a downwardly extending spout 8 and a manually operable snap-acting butterfly valve in the spout 8.

The butterfly valve comprises an elliptical vane not shown fixed to a spindle 9 extending diametrically through the spout 8.

One end of the spindle 9 is integral with a crank 10. A second spindle 11 extends diametrically through the spout 8 above the butterfly valve. The spindle 11 has a handle 12 fixed to it (which is outside of the cabinet in which the dispenser is housed) and a radius arm 13 connected by a tension spring 14 to the crank 10. Thus, rotation of the handle 12 in an appropriate direction causes the radius arm 13 to swing and the spring 14 to stretch until the line of action of the spring passes over the axis of the spindle 9, whereupon, the spring contracts and the butterfly valve is snapped through about 90° from one closed position through an open position to a second closed position. To effect a following operation of the dispenser the handle 12 is rotated in the opposite direction.

Thus, the crank 10 is caused to swing to and fro as the valve is operated and a stop if intruded into the path of the crank 10 would be effective to prevent the valve from being operated. Such a stop is used in the embodiment of the invention now being described but it will be appreciated that all manner of stop devices may be used in machines according to the invention depending on the particular design of the dispensers therein.

In the illustrated example of the invention the stop devices comprise a solenoid 15 with a pair of angle shaped abutments 16 on a bracket plate 17 fixed to its plunger 18 by means of a flange 19 integral with the bracket plate 17.

The solenoid plunger 18 is spring loaded to the extended position illustrated wherein an abutment 16 contacts the end of the crank 10 to interfere with movement thereof from either of the valve closed positions; but when the solenoid 15 is energized the plunger 18 is pulled into a retracted position such that the abutments 16 are clear of the crank 10.

Figure 3:
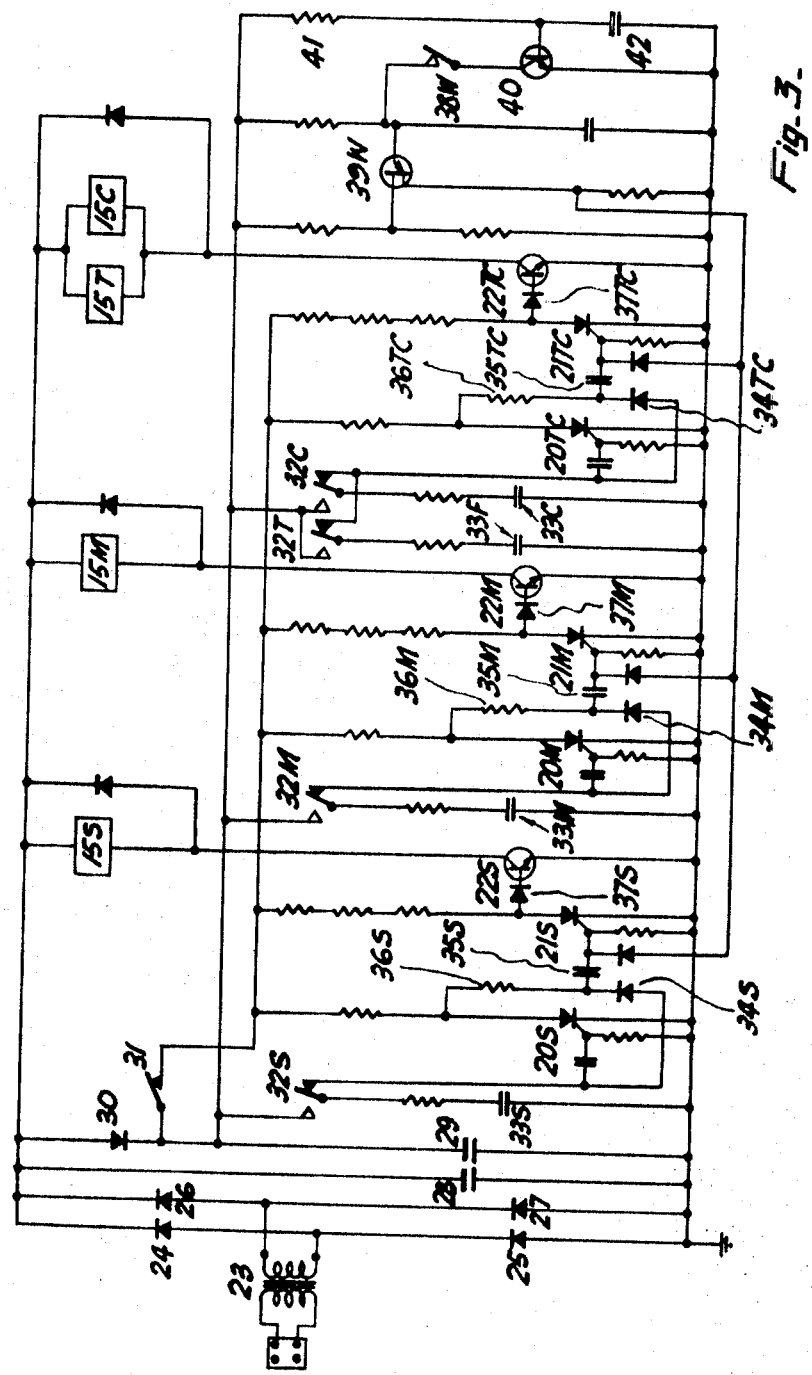
FIG. 3 is an electrical circuit diagram of coin operated means and auxiliary and main re-setting means of a tea and coffee dispensing machine incorporating a plurality of solids dispensers of the kind illustrated by FIGS. 1 and 2.

For descriptive convenience, in the further description of the FIGS. 1 to 3 embodiment of the invention including its mode of operation the various components of the machine are identified with reference to the dispensed material (tea, coffee, etc.) with which the component is associated in use. Also the reference numerals used in FIG. 3 are followed by the suffixes M, S, T, C, W, or TC depending on whether the components so identified are associated with the milk, sugar, tea, coffee, water or tea and coffee ingredients respectively; but where a plurality of like components are referred to the suffices are omitted. Likewise, the suffices do not appear in the reference numerals of FIGS. 1 and 2 as the dispensers illustrated thereby may be utilized for any one of the solid ingredients.

As there are four solids dispensers four stop operating solenoids 15 are provided, namely, a sugar solenoid 15S a milk solenoid 15M a tea solenoid 15T and a coffee solenoid 15C.

Three identical shift register circuit sections are provided to energize the four solenoids 15 upon insertion of a coin into the machine, each comprising two silicon controlled rectifiers 20 and 21 and a solenoid driver transistor 22.

The electrical circuitry as a whole is fed from a voltage supply comprising a step-down line transformer 23 feeding a bridge rectifier including diodes 24, 25, 26 and 27 and a smoothing capacitor 28. For preference, additional smoothing for the shift register circuit sections is provided by a capacitor 29 and a hold-off diode 30.

The three shift register circuit sections are supplied by way of a normally closed coin operated switch 31 included in a conventional coin receiving and monitoring device.

The switch 31 is momentarily opened by the passage of an appropriate coin through the receiving and monitoring device. Four auxiliary re-setting switches 32 are provided, each of which is self-biased to the position illustrated in the diagram, but is caused to change over to its other position momentarily on operation of its corresponding dispenser valve due to contact between the end of the crank 10 and a resilient operating lever 19 on the switch 32. Upon the insertion of a coin switch 31 opens and removes anode supply from all the SCRs 20 and 21 which, therefore, will all be non-conducting when switch 13 re-closes following the passage of the coin. Since SCRs 21 are non-conducting transistors 22 will be conducting and all of the solenoids 15 will be energized; thus, permitting manual operation of any and all of the dispenser valves.

Assuming the user desires sugar and operates the sugar valve, the auxiliary re-setting switch 32S will change over and then return allowing a pulse generating capacitor 33S to first charge and then discharge into the gate of 20S. The cathode end of diode 34S is at supply potential initially, so diode 34S is reverse biased and the pulse from capacitor 33S is blocked from passing to the gate of SCR 21S. When SCR 20S has been turned on a capacitor 35S is discharged through resistor 36S and a second pulse covered by a second operation of switch 32S if such occurs can pass through diode 34S to the gate of SCR 21S and trigger it into conduction. The base bias is thus removed from transistor 22S which is thus turned off, to de-energize solenoid 15S and block further operation of the sugar dispenser valve. The diode 37S provides an additional junction potential drop to ensure that transistor 22S has no residual base current and is completely turned off.

If the user requires milk he may operate the milk valve once or, at the most, twice to cause the milk circuits to function in exactly the same way as the sugar circuits described above.

In the case of the tea and coffee sections of the mechanism separate auxiliary re-setting switches 32T and 32C and pulse forming capacitors 33T and 33C are provided but the stop solenoids 15T and 15C are connected in parallel and controlled by a single tea-coffee shift register. The operation of either the tea or coffee dispenser valve causes first one and maybe a second pulse to cause components 20TC, 21TC and 22TC to function in the same way as components 20S, 21S and 22S described above.

If an attempt is made to operate both the tea and coffee dispenser valves simultaneously one operation will take precedence over the other unless they coincide to within a few milliseconds. Thus the possibility of users being able to obtain simultaneous servings of tea and coffee (one not paid for) is very slight and the additional circuitry required to prohibit this is thought to be unwarranted.

Having obtained all the solid ingredients he requires, the user may then open manually operated water valve to obtain water, thereby causing a normally closed, main re-setting switch 38W associated with that valve to be briefly opened.

For so long as switch 38W is open unijunction transistor 39W generates a stream of pulses which are fed to the gates of all SCRs 21 so ensuring they are turned off causing all solenoids 15 to be de-energized irrespective of the number of times the tea, milk, tea or coffee dispenser valves may have been operated, if any.

When A.C. line power is first applied, or if it is removed and re-applied, all SCRs are in the non-conducting condition so that all solenoids are energized and free servings would be obtainable.

This is prevented by a unijunction transistor 39W in conjunction with a transistor 40 as follows. When power is applied, the emitter circuit and the inter-base circuit of 39W are energized, but the base potential of 40 is constrained to rise generally by a delay circuit comprising resistor 41 and capacitor 42. Thus 39W generates a stream of pulses, causing all solenoids to be re-set and the dispenser valves to be locked, until 40 begins to conduct and disables 39W.

Figures 4, 5:
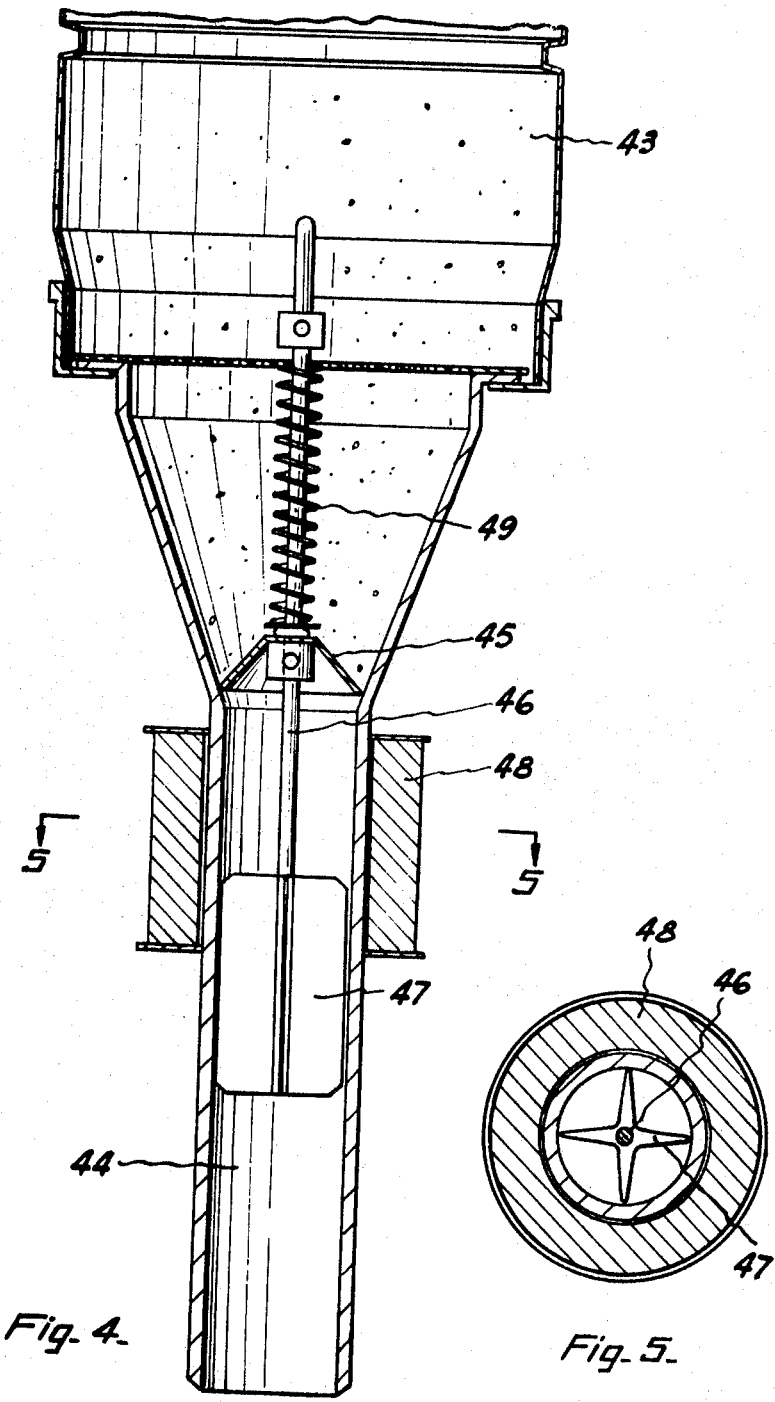
FIG. 4 is a sectional elevation of a bottom part of an electrically operated solids dispenser.
FIG. 5 is a sectional view taken on line 5—5 of FIG. 4.
Figure 6:
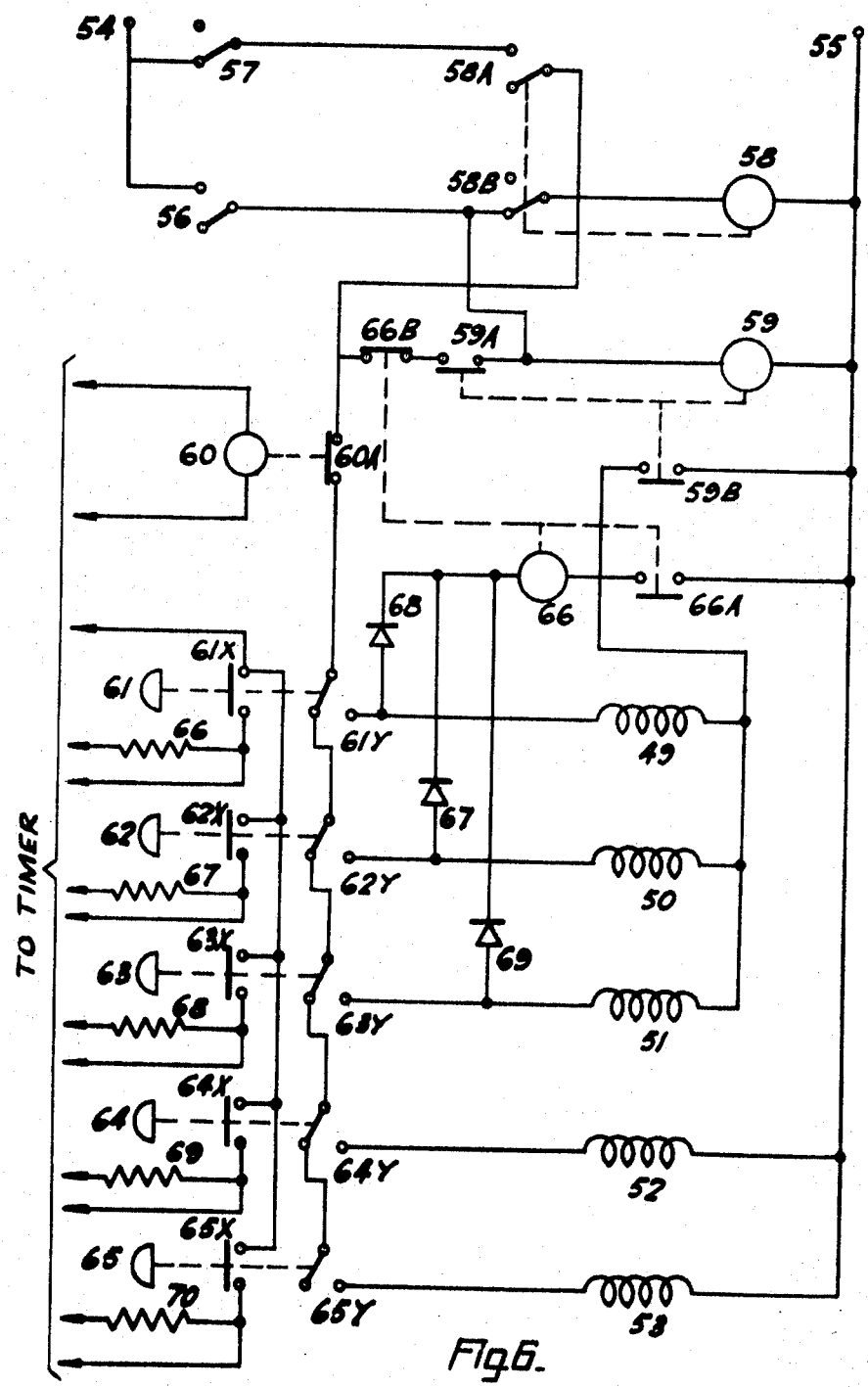
FIG. 6 is an electrical circuit diagram of a soups dispensing machine including a plurality of electrically operated solids dispensers such as the dispenser of FIGS. 4 and 5.

The embodiment of the invention illustrated by FIGS. 4, 5 and 6 includes solids dispensers having a container 43 with an outlet spout 44 similar to the corresponding parts of the earlier described embodiment. In the present instance, however, the dispenser valve is electrically operated and comprises a valve element 45 on a valve spindle 46 fixed to a cruciform section core 47, and a solenoid coil 48. The arrangement is such that when the solenoid 48 is energized the core 47 is drawn upwardly against the effect of a loading spring 49 to lift the valve element 45 and allow material to flow from the container 43. In use the solenoid 48 is energized by way of a push-button switch or the like under the control of a timer which limits the duration of each period of energization, thereby determining the quantity of material dispensed at each operation.

The solids dispenser illustrated by FIGS. 4 and 5 is conventional in nature and in other embodiments of the invention may be replaced by other conventional manually controlled electrically operated dispensing devices.

The embodiment of the invention now being described is adapted for use as a soups dispensing machine and includes three solids dispensers for the supply of soup powders. Those three solids dispensers are controlled by coin operated means in accordance with the invention. The machine includes two further solids dispensers for the supply of seasonings such as salt and pepper, but because of the relatively low cost of those ingredients and because the quantity of each which each user may require varies widely from user to user, the seasonings dispensers are not controlled by auxiliary re-setting means and may be operated, once the machine has been coin-freed, as many times as desired until such time as the main re-setting means operate. Thus, the two seasonings dispensers although present in the machine in practice are additional to and not components of the invention.

The operating solenoids of the three solids dispensers of the invention are referenced 49, 50 and 51 in FIG. 6, whereas the operating solenoids of the two seasonings solids dispensers are referenced 52 and 53.

The machine is fed from a conventional alternating current supply applied to terminals 54 and 55 and includes conventional coin monitoring and receiving mechanism of the kind which causes a coin switch 56 to be closed momentarily upon the insertion of an appropriate coin.

The machine also includes a manually operable valve for the feed-out of water from a hot water tank which is conventional in nature. The valve is push-button operated and when the push-button is depressed as well as opening the water dispenser valve it also serves to operate a water valve switch 57.

The switch 57 is arranged to be closed (as drawn) when the water dispenser valve is closed.

A hold-in relay 58 is provided with two sets of contacts 58A and 58B which are in the position illustrated when the hold-in relay 58 is de-energized and which change their positions when the hold-in relay 58 is energized. The contacts 58A and 58B are arranged so that upon operation of the hold-in relay 58 contacts 58A close before contacts 58B open. Therefore, when the coin switch 56 is closed momentarily the hold-in relay 58 is energized through contact 58B following which supply to remainder of the circuit is maintained via contacts 58A and the water valve switch 57.

Simultaneously, the momentary closing of the coin switch 56 energizes a coin relay 59 with contacts 59A and 59B which then close to maintain energization of the coin relay 59 via the closed contacts 58A, contacts 59A and the water valve switch 57.

Operation of the coin relay 59 also closes its B contacts but with no immediate effect.

The machine is provided with an electronic timer arranged to operate a timer relay 60. The timer is a well known kind wherein the operating time is determined by the value of an external resistance connected to the timer.

The solenoids 49 to 53 have manually operable push-button switches 61 to 65 associated with them respectively. Each of the push-button switches 61 to 65 has two sets of contacts, 61X to 65X and 61Y to 65Y respectively.

Each of the push-button switch X contacts when closed connects the timer to a corresponding one of control resistors 66 to 70 respectively. For preference, each of the control resistors is adjustable in value so that the timed interval may be adjusted to suit the flow properties of the various ingredients to be dispensed.

Thus, upon operation of any one of the push-button switches the timer is set to operate after a delay period determined by the value of the corresponding control resistor.

Operation of any one of the push-button switches also energizes a corresponding one of the dispenser solenoids 49 to 53 (so long as a coin has been inserted and the hold-in relay 58 and coin relay 59 are energized as described earlier). At the end of the timed period the timer energizes timer relay 60 causing it to open its contacts 60A thereby de-energizing the dispenser solenoid in question.

If it is either of push-button switches 64 or 65 which is operated the above-described dispensing cycle may be repeated if desired. However, if, say push-button switch 62 is operated the following sequence of events occurs. Contacts 62Y close to energize dispenser solenoid 50. At the same time a sequence relay 66 is energized by way of diode 67 and contacts 59B.

The diode 67 and diodes 68 and 69 are provided to prevent cross-connection between the solenoids 49, 50 and 51 so that operation of push-button switch 62 does not cause spurious operation of solenoids 49 and 51.

The sequence relay 66 is such that when it is energized its contacts 66A close before its contacts 66B open. When the latter do open the coin relay 59 is de-energized allowing its contacts to revert to the illustrated position, but supply to the operating solenoids and the sequence relay 66 is maintained through the latter's A contacts. As soon as the timer contacts 60A open not only is the dispenser solenoid 50 de-energized but also the sequence relay 66 is de-energized. That is to say, both sets of contacts 59B and 66A are opened rendering a further operation of any one of solenoids 41, 50 or 51 impossible until such time as the entire sequence is started again by the insertion of a further coin.

It will be apparent that operation of push-button 61 or 63 produces effects exactly analogous to the above-described effects of the operation of push-button 62.

Having obtained his solids ingredients the user of the machine may then manually operate the water valve causing switch 57 to open thereby de-energizing hold-in relay 58 causing its contacts to revert to the illustrated position thereby removing the entire supply from the dispensers until such time as a fresh coin is inserted.

It will be appreciated that the circuit arrangements described above with reference to both embodiments of the invention are merely examples of many possible arrangements and the present invention extends to all such means effective to control the operation of the ingredient dispenser valves or their equivalent in the manner indicated above. Furthermore, it is not essential that the main re-setting means be associated with the water dispenser, it may be associated with any one of the dispensers.

I claim:

1. A beverage dispensing machine, comprising a liquid dispenser, a plurality of normally inoperative solids dispensers, coin operated means rendering at least said solids dispensers operative upon insertion of a coin, auxiliary re-setting means associated with all but a remaining one of said dispensers adapted to return a predetermined selection of said solids dispensers to the inoperative condition in consequence of a predetermined number of operations of any one of the dispensers with which said auxiliary re-setting means is associated neither said selection nor said number of operations necessarily being the same for each such dispenser, and a main re-setting means associated with said remaining one dispenser such that operation of said remaining one dispenser causes all said solids dispensers not previously rendered inoperative by said auxiliary re-setting means to be rendered inoperative.

2. A machine according to claim 1 wherein said remaining one dispenser is the liquid dispenser.

3. Apparatus according to claim 1 wherein each of said solids dispensers is manually operable and is rendered inoperative by a solenoid operated sprag, said coin operated means being effective to energize the solenoids to withdraw the sprags and the re-setting means being effective to de-energize the solenoids to permit the sprags to return to an obstructing position.

4. A machine according to claim 1 wherein each of said solids dispensers is electrically operated by way of a manually operable switch and said coin operated means are effective to supply electricity to the manually operative switches while the re-setting means are effective to dis-connect that supply.

5. A dispenser machine according to claim 1 wherein the auxiliary re-setting means are such that operation of at least one said solids dispenser is effective to re-set that solids dispenser and at least one other solids dispenser.

6. A machine according to claim 1 wherein the auxiliary re-setting means are such that at least one solids dispenser is required to be operated more than once to render the auxiliary re-setting means effective.

7. A machine according to claim 1 including further solids dispensers without associated auxiliary re-setting means.

* * * * *